United States Patent

Murata

(10) Patent No.: US 8,050,161 B2
(45) Date of Patent: Nov. 1, 2011

(54) OPTICAL DISK DRIVE

(75) Inventor: Tatsuya Murata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 611 days.

(21) Appl. No.: 12/056,208

(22) Filed: Mar. 26, 2008

(65) Prior Publication Data

US 2008/0285411 A1 Nov. 20, 2008

(30) Foreign Application Priority Data

May 16, 2007 (JP) ................................ 2007-130473

(51) Int. Cl.
G11B 5/58 (2006.01)
G11B 20/18 (2006.01)
(52) U.S. Cl. .................. 369/53.14; 369/53.3; 369/47.44
(58) Field of Classification Search ............... 369/53.14, 369/53.4, 53.41, 53.43; 360/31, 55, 71, 73.01, 360/73.03
See application file for complete search history.

(56) References Cited

U.S. PATENT DOCUMENTS

| | | | |
|---|---|---|---|
| 6,195,322 B1 | 2/2001 | Ohtani et al. | |
| 6,351,440 B1 | 2/2002 | Fukuda | |
| 6,631,105 B1 * | 10/2003 | Fukuda et al. | 369/47.44 |
| 2001/0004342 A1 * | 6/2001 | Noda et al. | 369/44.32 |
| 2002/0034140 A1 | 3/2002 | Fukuda | |
| 2002/0114243 A1 | 8/2002 | Ohta | |
| 2002/0140120 A1 | 10/2002 | Suzuki et al. | |
| 2002/0191506 A1 * | 12/2002 | Okamoto et al. | 369/47.4 |
| 2004/0179443 A1 | 9/2004 | Choo | |
| 2007/0274178 A1 | 11/2007 | Kuroda | |

FOREIGN PATENT DOCUMENTS

| | | |
|---|---|---|
| CN | 1377036 A | 10/2002 |
| CN | 1542803 A | 11/2004 |
| CN | 1713287 A | 12/2005 |
| EP | 1469470 A2 | 10/2004 |
| JP | 6004892 A | 1/1994 |
| JP | 8227561 A | 9/1996 |
| JP | 9251709 A | 9/1997 |

(Continued)

OTHER PUBLICATIONS

Office Action dated May 27, 2010 in the corresponding Chinese Application No. 200810087294.0, 12 pages.

(Continued)

Primary Examiner — Joseph Haley
Assistant Examiner — Nicholas Lee
(74) Attorney, Agent, or Firm — Seep IP Law Group PLLC

(57) ABSTRACT

An optical disk drive capable of reproducing data even when warpage is present in an optical disk. A system controller of the optical disk drive reproduces data by setting a maximum speed in accordance with the type of an optical disk, an amount of side-to-side runout, or the like. In the meantime, when a read error arises as a result of trial reproduction being performed at an outer radius of the disk at startup, warpage is determined to be present in the optical disk, and a limitation on the maximum speed is raised. The rotational speed is set to allowable maximum speed of the optical disk drive, and warpage is corrected by means of centrifugal force. When reproduction becomes impracticable for reasons of meandering of a tack, or the like, during the course of reproduction of data, the rotational speed is decreased, to thus perform a retry.

10 Claims, 3 Drawing Sheets

FOREIGN PATENT DOCUMENTS

| | | |
|---|---|---|
| JP | 10-40640 A | 2/1998 |
| JP | 10092090 A | 4/1998 |
| JP | 2002-251844 A | 9/2002 |
| JP | 2003-297007 A | 10/2003 |
| JP | 2004-281041 A | 10/2004 |
| JP | 2004326939 A | 11/2004 |
| TW | 337580 A | 8/1998 |
| WO | 2005088611 A1 | 9/2005 |

OTHER PUBLICATIONS

Office Action in corresponding JP Application No. 2007-130473, mailed Mar. 22, 2011, 5 pages.

Japanese Office Action issued in corresponding JP Application No. 2007-130473, mailed Jun. 14, 2011, 3 pages.

Chinese Office Action for corresponding CN Application No. 200810087294.0, mailed May 25, 2011, 12 pages.

\* cited by examiner

OPTICAL DISK DRIVE

PRIORITY INFORMATION

This application claims priority to Japanese Patent Application No. 2007-130473 filed on May 16, 2007, which is incorporated herein by reference in its entireties.

BACKGROUND

1. Technical Field

The present invention relates to an optical disk drive, and more particularly to reproduction processing performed when warpage is present in an optical disk.

2. Related Art

A reproduction rate of an optical disk is appropriately optimized according to a reproducing state. For instance, when data are reproduced by means of; for example, equipment incorporated in or connected to a personal computer, the data must be reproduced as fast as possible, and hence a reproduction rate is increased. Further, at the time of playback of a video or music, a transfer rate is determined. Therefore, a reproduction rate which is faster than the predetermined transfer rate is not required. Even if data can be reproduced at high speed, the reproduction rate is maintained at a low rate in consideration of tranquility.

In the meantime, when side-to-side runout or mass eccentricity is present in an optical disk or when meandering of a track, or the like, is present, data cannot be read when reproduction is performed at a high rate, thereby resulting in occurrence of an error. In consideration of this, decreasing the reproduction rate has been proposed.

JP 10-40640 A discloses that, when excessive vibrations arise in the middle of a disk being subjected to high-speed production or when mass eccentricity of predetermined levels is detected, the rotational speed of the disk is reduced to perform reproduction at a low rate, thereby diminishing vibrations.

JP2002-251844 A discloses that, when a poorly-readable area, such as a defect, is detected, data recorded in the poorly-readable area are read without decreasing the rotational speed of the optical disk by means of switching a cutoff frequency of a high-pass filter.

JP 2003-297007 A discloses that the rotational speed of a disk is set to the minimum rotational speed when reproduction of the disk is started and that control is performed so as to increase the rotational speed of the disk stepwise until a read error arises, whereby, when compared with a case where the rotational speed is reduced from the maximum rotational speed, a time elapsed before reproduction is shortened.

JP 2004-281041 A discloses that, when data are recorded/reproduced in or from an optical disk that rotates at predetermined equiangular velocity, occurrence of an error during recording/reproduction of data is monitored and that, when occurrence of an error during recording/reproduction of data is detected, the rotational speed of the optical disk is controlled so as to come to equiangular velocity which is lower than the predetermined equiangular velocity, thereby shortening a time required to record/reproduce data.

In any of the related-art techniques, when a poorly-readable area is detected, the rotational speed of the disk is indiscriminately reduced as compared with a case where the poorly-readable area is not detected. However, under such a control method for indiscriminately reducing rotational speed, data cannot be read when warpage is present in an optical disk.

When an optical disk drive is equipped with a lens tilting device, the essential requirement is to control tilt of a lens in conformance to warpage in the optical disk. However, incorporation of the lens tilting device leads to an increase in the number of components, an increase in cost, and an increase in the size of the optical disk drive or an optical pickup. Accordingly, the ability to address warpage in an optical disk without incorporation of a lens tilting device is desirable.

SUMMARY

The present invention provides an optical disk drive capable of reproducing data even when warpage is present in an optical disk.

The present invention is directed toward an optical disk drive for reproducing data in an optical disk, comprising:

a detection section for detecting warpage in the optical disk; and a control section for correcting the warpage, when the warpage is detected, by increasing rotational speed of the optical disk as compared with a case where the warpage is not detected.

The present invention is directed toward an optical disk drive for reproducing data in an optical disk, comprising:

a section for reproducing data at an outer radius of the optical disk for a try; and a control section for performing reproduction when trial reproduction is impracticable by increasing rotational speed of the optical disk as compared with a case where trial reproduction is practicable.

Moreover, the present invention is directed toward an optical disk drive for reproducing data in an optical disk, comprising:

a section for setting a first maximum speed in accordance with type of an optical disk;

a section for reproducing data at an outer radius of the optical disk and at the first maximum speed for a try; and a control section for reproducing data by means of rotationally driving the optical disk at second maximum speed that is lower than the first maximum speed, in accordance with any of an amount of side-to-side runout, mass eccentricity, or eccentricity of the optical disk when trial reproduction is possible and by means of rotationally driving the optical disk at a third maximum speed that exceeds the first maximum speed when trial reproduction is impracticable.

According to the present invention, warpage is corrected by increasing the rotational speed of an optical disk, so that the chance of reproduction of data is enhanced.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings.

Figure 1:
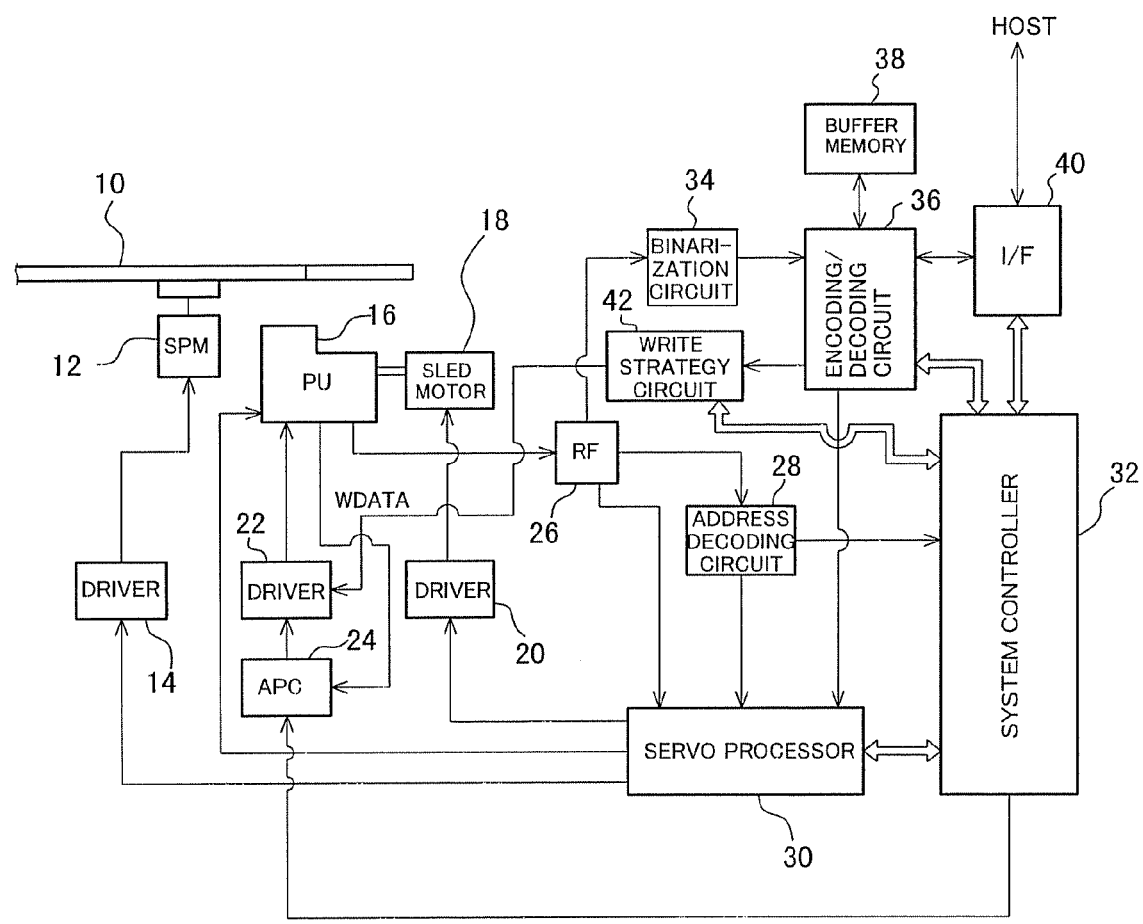
FIG. 1 is an overall block diagram of an optical disk drive.

FIG. 1 shows an overall block diagram of an optical disk drive of the present embodiment. An optical disk 10, such as a CD, a DVD, an HD-DVD, a BD, and the like, is rotationally driven by a spindle motor (SPM) 12. A spindle motor SPM 12 is driven by a driver 14, and the driver 14 is servo-controlled by a servo processor 30 so as to attain desired rotational speed.

An optical pickup 16 includes a laser diode (LD) for emitting a laser beam to the optical disk 10 and a photodetector (PD) that receives light reflected from the optical disk 10 and converts the thus-received light into an electrical signal; and is disposed opposite the optical disk 10. The optical pickup 16 is driven in a radial direction of the optical disk 10 by a sled motor 18, and the sled motor 18 is driven by a driver 20. The driver 20 is servo-controlled by the servo processor 30 as in the case of the driver 14. Further, the LD of the optical pickup 16 is driven by a driver 22. A drive current of the driver 22 is controlled by an automatic power control circuit (APC) 24 in such a way that laser power comes to a desired level. In accordance with a command from a system controller 32, the APC 24 and the driver 22 control an amount of light emitted from the LD. In the drawing, the driver 22 is provided separately from the optical pickup 16. However, as will be described later, the driver 22 may also be incorporated in the optical pickup 16.

At the time of reproduction of data recorded in the optical disk 10, a laser beam of reproducing power is emitted from the LD of the optical pickup 16, and the PD converts reflected light of the beam into an electrical signal and outputs the signal. A reproduction signal from the optical pickup 16 is supplied to an RF circuit 26. The RF circuit 26 generates, from the reproduction signal, a focus error signal and a tracking error signal, and supplies the thus-generated signals to the servo processor 30. The servo processor 30 servo-controls the optical pickup 16 in accordance with these error signals, thereby maintaining the optical pickup 16 in an on-focus state and an on-track state. Moreover, the RF circuit 26 supplies an address signal included in the reproduction signal to an address decoding circuit 28. The address decoding circuit 28 demodulates from the address signal address data pertaining to the optical disk 10 and supplies the thus-demodulated address data to the servo processor 30 and the system controller 32.

An example of the address signal is a wobble signal. A track of the optical disk 10 is wobbled by means of a modulated signal of time information showing an absolute address of the optical disk 10. The wobble signal is extracted from the reproduction signal, and the thus-extracted signal is decoded, to thus enable acquisition of address data (ATIP). The RF circuit 26 supplies the reproduced RF signal to a binarization circuit 34. The binarization circuit 34 binarizes the reproduction signal and supplies a resultantly-acquired signal to an encoding/decoding circuit 36. The encoding/decoding circuit 36 subjects the binarized signal to demodulation and error correction, to thus acquire reproduction data; and outputs the reproduction data to a host machine, such as a personal computer, by way of an interface I/F 40. When the reproduction data are output to the host machine, the encoding/decoding circuit 36 temporarily stores the reproduction data into the buffer memory 38 and subsequently outputs the data.

In a case where the optical disk 10 is a data-recordable optical disk, data to be recorded from the host machine are supplied to the encoding/decoding circuit 36 at the time of recording of data by way of the interface I/F 40. The encoding/decoding circuit 36 stores the data to be recorded into the buffer memory 38; encodes the data to be recorded; and supplies the thus-encoded data as modulated data to a write strategy circuit 42. In accordance with a predetermined recording strategy, the write strategy circuit 42 converts the modulated data into a multipulse (a pulse train) and supplies the multipulse as record data to the driver 22. Since a recording strategy affects recording quality, the strategy is usually fixed to an optimum strategy. A laser beam whose power is modulated by means of the record data is emitted from the LD of the optical pickup 16, whereupon data are recorded in the optical disk 10. After recording of the data, the optical pickup 16 emits a laser beam of reproducing power, to thus reproduce the record data; and supplies the record data to the RF circuit 26. The RF circuit 26 supplies a reproduction signal to the binarization circuit 34, and binarized data are supplied to the encoding/decoding circuit 36. The encoding/decoding circuit 36 decodes the modulated data and verifies the decoded data against record data stored in the buffer memory 38. A result of verification is supplied to the system controller 32. In accordance with the result of verification, the system controller 32 determines whether to continually record the data or to perform alternating operation.

The system controller 32 controls operation of the overall system. However, in the present embodiment, the system controller 32 controls the rotational speed of the optical disk 10 particularly during reproduction of data. Specifically, the system controller 32 supplies a control signal to the driver 14, thereby limiting the rotational speed of the optical disk 10 to the maximum speed conforming to the type of the optical disk 10. When side-to-side runout, mass eccentricity, or eccentricity is present in the optical disk 10, a limitation is imposed on the maximum speed in order to reduce the influence of side-to-side runout, mass eccentricity, or eccentricity. In the case of meandering of a track or low data recording quality, control is performed so as to reduce the rotational speed of the optical disk 10 as in the case of the related-art optical disk drive. In the meantime, when warpage is present in the optical disk 10, rotational speed is not decreased or limited but conversely increased, whereupon warpage is corrected by means of centrifugal force stemming from rotation. Specifically, when warpage is present in the optical disk 10, the optical disk 10 is rotationally driven at the maximum speed at which the optical disk drive can be driven rather than a limitation conforming to the type of the optical disk 10, an amount of side-to-side runout, or the like, being imposed on the maximum speed. Specifically, the optical disk 10 is driven at rotational speed at which a priority is given to correction of warpage rather than at rotational speed conforming to the type of the optical disk, the amount of side-to-side runout, or the like, thereby reproducing data. Furthermore, there is a potential of an increase in rotational speed of the optical disk 10 leading to correction of warpage but rendering the influence of side-to-side runout or mass eccentricity noticeable. Therefore, in a case where the optical disk drive is rotationally driven at the maximum speed of the optical disk drive in order to correct warpage in the optical disk 10, thereby reproducing data, if a read failure (a read error) has arisen, a retry will be performed by decreasing the rotational speed.

Presence/absence of warpage in the optical disk 10 can be detected (presence of warpage can be estimated) by reproducing data at an outer radius of the optical disk 10 for a tray. When the optical disk drive is equipped with a lens tilting device, tilt of the optical disk 10 (an amount of tilt) can be measured. However, when the lens tilting device is not incorporated, the optical pickup 16 is caused to seek the outer radius of the optical disk 10, and data are reproduced for a try from an area in the outer radius where the influence of warpage is noticeable. When trial reproduction of data is possible, warpage is determined not to be present, or warpage is deemed to be insignificant. When trial reproduction is not possible, warpage can be estimated to be present. Presence/absence of warpage in the optical disk 10 can be determined by means of startup processing preceding data reproduction.

Figure 2:
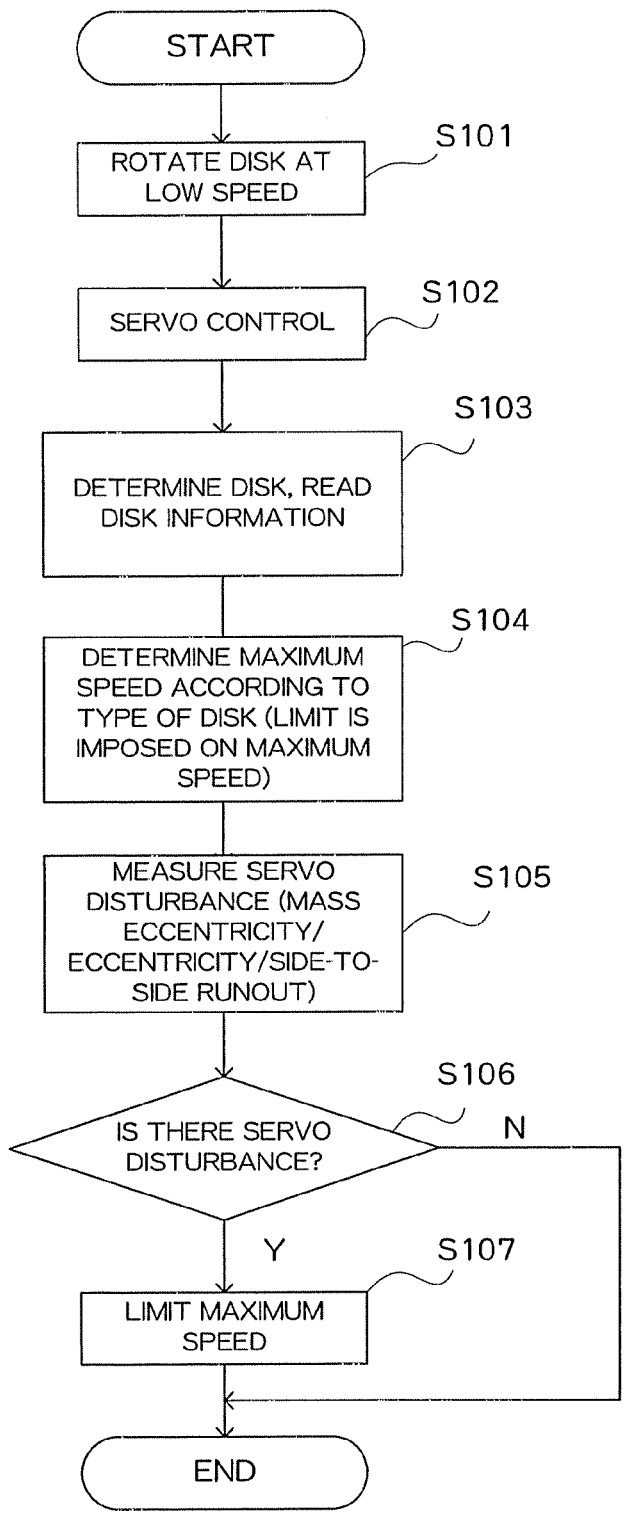
FIG. 2 is a flowchart of general processing performed at startup.

FIG. 2 shows general startup processing; namely, processing performed when warpage in the optical disk 10 is not detected.

In FIG. 2, when the optical disk 10 is loaded in the optical disk drive, the system controller 32 supplies a control signal to the driver 14 to rotationally drive the spindle motor 12, thereby rotating the optical disk 10 at predetermined low speed (S101). A servo system is adjusted while the optical disk 10 is being rotated at low speed; namely, while tracking servo and focus servo are being operated (S102), to read disk information recorded in a lead-in area of the optical disk 10, thereby determining the type of the loaded optical disk 10 (S103). Specifically, a CD, a DVD, an HD-DVD, and a BD (Blu-ray Disk) are discriminated from each other. In the case of the CD, a determination is made as to whether the CD is a CD-DA, CD-ROM, a CD-R, or a CD-RW. In the case of the DVD, a determination is made as to whether the DVD is DVD-ROM, a DVD±R, a DVD±RW, and DVD-RAM. The same also applies to the HD-DVD and the BD, thereby determining the disk to be read-only or recordable. After the type of the optical disk 10 has been determined, the maximum speed (the first maximum speed) is set according to the determined type of the optical disk 10 (S104). For instance, when the optical disk 10 is a DVD±R, the maximum speed is set to 8× speed. In the case of a DVD±RW, the maximum speed is set to 6× speed. The maximum speeds are previously determined for respective types of the optical disks 10, and the thus-determined speeds are stored in the form of a map in the memory of the system controller 32. The maximum speed is set by use of the map. The maximum speed for data may also be set as distinguished from the maximum speed for a video and audio.

After the maximum speed (the first maximum speed) is set according to the type of the optical disk 10, servo disturbance is measured (S105). Measurement of servo disturbance is for measuring an amount of side-to-side runout, mass eccentricity, or eccentricity in the optical disk 10. For example, the optical disk 10 is rotationally driven at the maximum speed set in S104, to thus detect and measure an amplitude of an error signal of the servo system. When servo disturbance is present, the amplitude of the error signal (e.g., a tracking error signal) is increased. Servo disturbance is determined to be present from a result of measurement of servo disturbance. Namely, when servo disturbance (the amplitude of an error signal of the servo) is compared with a predetermined value and when the predetermined value or more is achieved, servo disturbance is determined to be present (S106), and the second maximum speed is set by imposing a further limitation on the maximum speed set in S104 (S107). In the meantime, when no servo disturbance is determined to be present in S106, the maximum speed (the first maximum speed) set in S104 is maintained as it is.

Startup processing of the present embodiment will now be described. Processing for detecting warpage in the optical disk 10 is performed at startup.

Figure 3:
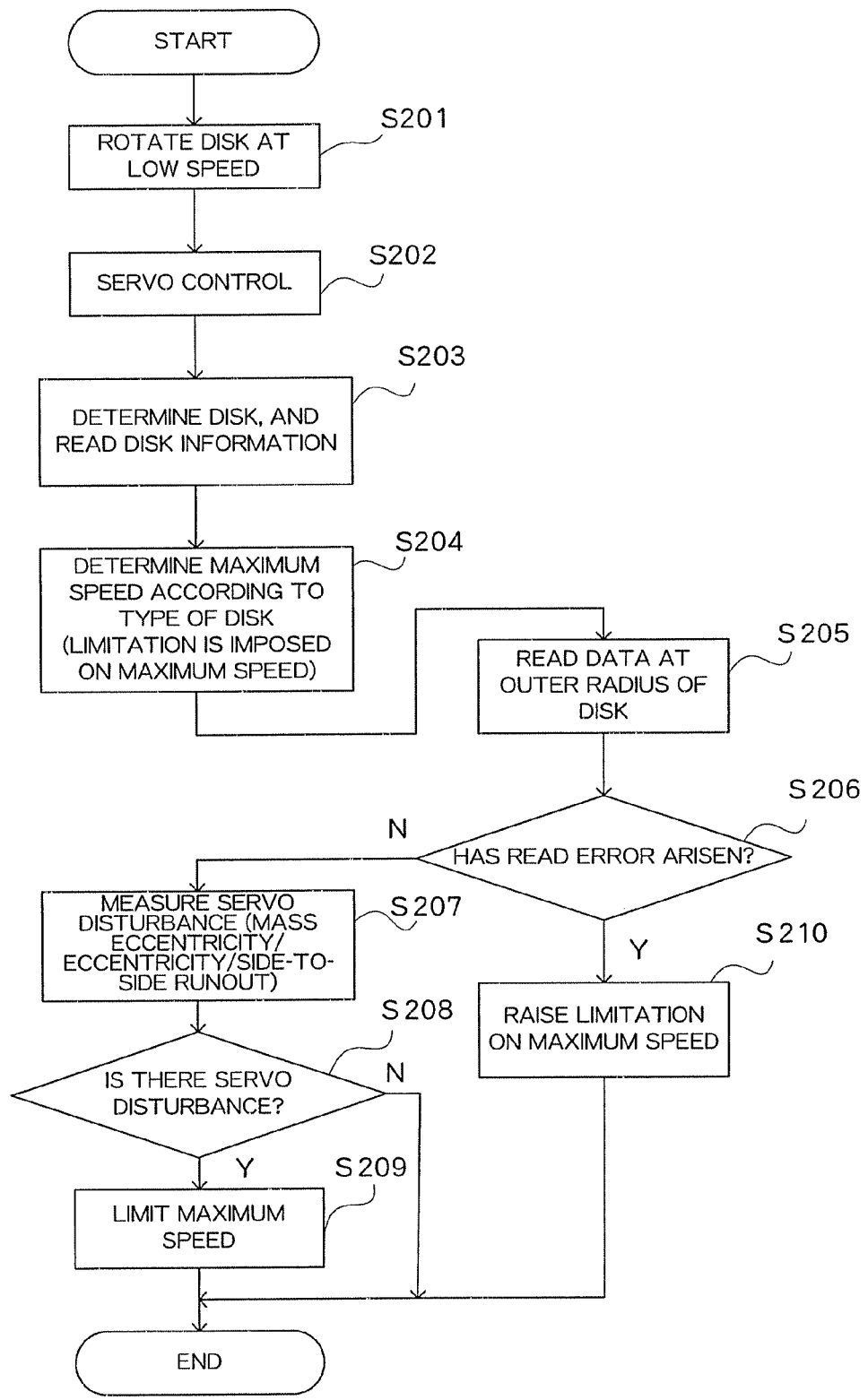
FIG. 3 is a flowchart of processing performed at startup.

In FIG. 3, when the optical disk 10 is loaded into the optical disk drive, the system controller 32 feeds a control signal to the driver 14, to thus rotationally drive the spindle motor 12 and rotate the optical disk 10 at predetermined low speed (S201). While the optical disk 10 is being rotated at low speed, the servo system is adjusted; namely, a tracking servo and a focusing servo are operated (S202), thereby reading disk information recorded in the lead-in area of the optical disk 10 and determining the type of the loaded optical disk 10 (S203). The maximum speed (first maximum speed) is set in accordance with the type of the optical disk 10 (S204).

After the maximum speed (the first maximum speed) has been set in accordance with the type of the optical disk 10, the optical pickup 16 is caused to seek the outer radius of the optical disk 10 and perform reproduction at the outer radius for a try (S205). Trial reproduction is performed by rotationally driving the optical disk 10 at the first maximum speed, and a determination is made as to whether or not a read error arises when trial reproduction is performed (S206). When warpage is present in the optical disk 10, the influence of warpage is noticeable at an intermediate radius than at an inner radius and at the outer radius than at the intermediate radius. When trial reproduction is performed at the outer radius, there is a high probability of occurrence of a read error. When a read error has arisen, the limitation imposed on the maximum speed in S204 is raised, and the allowable maximum speed (the third maximum speed) at which the optical disk drive can be driven is set, and warpage is corrected by means of centrifugal force (S210).

In the meantime, when no read error arises, servo disturbance is measured as in the case shown in FIG. 2 (S207). Measurement of servo disturbance is for measuring an amount of side-to-side runout, mass eccentricity, or eccentricity of the optical disk 10. The optical disk 10 is rotationally driven at the first maximum speed set in S204, thereby detecting and measuring an amplitude of an error signal of the servo system. When servo disturbance is present, the amplitude of the error signal (e.g., a tracking error signal) is increased. Servo disturbance is determined to be present from a result of measurement of servo disturbance. Namely, when servo disturbance (the amplitude of the error signal of the servo) is compared with a predetermined value and when the predetermined value or more is achieved, servo disturbance is determined to be present (S208), and the second maximum speed is set by imposing a further limitation on the first maximum speed set in S204 (S209). In the meantime, when no servo disturbance is determined to be present, the maximum speed (the first maximum speed) set in S204 is maintained as it is.

As mentioned above, any one of the first maximum speed, the second maximum speed, and the third maximum speed is set in accordance with presence/absence of warpage, side-to-side runout, mass eccentricity, or the like, in the optical disk 10. Here, there stands a relationship of the third maximum speed>the first maximum speed>the second maximum speed. Data are reproduced at the thus-set maximum speed.

When data are reproduced at the third maximum speed, warpage in the optical disk 10 is corrected, and data can be reproduced. However, it may also be the case where a read error will arise for another reason; for example, meandering of a track, low recording quality, or the influence of side-to-side runout. In this case, there is performed retry processing for decreasing the rotational speed of the optical disk 10 from the third maximum speed, to thus again reproduce data in a data-irreproducible area, as in the case of the related-art technique. Since the rotational speed is decreased from the third maximum speed, the effect for correcting warpage by means of centrifugal force is lessened. However, meandering of a track or the influence of low recording quality, which has become the cause of the read error, can be lessened, and hence the possibility of reproduction of data is improved. When data can be reproduced as a result of a retry having been performed by lowering the rotational speed, reproduction of data is continually performed by returning the rotational speed to the third maximum speed. When rotational speed is decreased, a sequential, stepwise decrease in rotational speed is preferable. The optical disk drive can be driven at; for example, 2× speed, 4× speed, 6× speed, 8× speed, 10× speed, and 12× speed. When the third maximum speed is 12× speed, the rotational speed is first decreased from 12× speed to 10× speed in the event of a read error, thereby performing a retry. When a read error still arises, the rotational speed is decreased from 10× speed further to 8× speed, thereby performing a retry. As a matter of course, if the rotational speed is decreased too much, the effect of correcting warpage by means of centrifugal force will be considerably diminished, and a read error may stem from warpage. For this reason, it is desirable to minimize a decrease in rotational speed. Specifically, the rotational speed is desirably decreased to such an extent that warpage can be corrected and such that meandering of a track, side-to-side runout, or the like, can be addressed. In the above embodiment, when the third maximum speed is 12× speed; the first maximum speed is 8× speed; and the second maximum speed is 6× speed, a retry is performed by decreasing the rotational speed from 8× speed to 6× speed. When a read error still arises, the retry may also be aborted, to thus stop reproduction of data.

In the present embodiment, when warpage is present in the optical disk 10, data are reproduced by setting the rotational speed to the third maximum speed. However, warpage in the optical disk 10 is noticeable particularly at the outer radius of the disk, as mentioned previously. Hence, the optical disk 10 is divided into three zones; namely, an inner radius, an intermediate radius, and an outer radius. Data are reproduced at the second maximum speed in the inner and intermediate radius zones, and data are reproduced at the third maximum speed in the outer radius zone, to thus correct warpage. Alternatively, data may also be reproduced at the second maximum speed in only the inner radius zone, and data may also be reproduced at the third maximum speed in the intermediate and outer radius zones, to thus correct warpage.

In a case where data are reproduced at the second maximum speed in only the inner radius zone or where data are reproduced at the second maximum speed in the inner and intermediate radius zones, when a read error arises, a retry is basically performed by decreasing the rotational speed as mentioned above. When the read error is attributable to flaw or stains rather than to meandering of a track, low recording quality, side-to-side runout, or the like, the influence of the flaws or stains will become noticeable by decreasing the rotational speed, thereby degrading reproducibility. For this reason, it is preferable to conversely increase the rotational speed, to thus perform a retry. Specifically, when a read error arises for reasons of flaws or stains, a retry is performed by increasing the rotational speed from the second maximum speed to the first maximum speed or the third maximum speed. Since the disk is already driven at the third maximum speed in the outer radius zone, such control operation for increasing the rotational speed is not necessary.

In the present embodiment, trial reproduction is performed at the outer radius of the optical disk 10. Presence/absence of warpage in the optical disk 10 is detected by determining whether or not a read error arises. However, warpage in the optical disk 10 may also be detected by another method. For instance, warpage in the optical disk 10 may previously be measured, and a result of measurement may be recorded as disk information in a read-in area. Warpage information may be acquired by reading the information.

What is claimed is:

1. An optical disk drive for reproducing data in an optical disk, comprising:
    a section for setting a maximum rotational speed of the optical disk in accordance with a type of the optical disk;
    a detection section for detecting warpage in the optical disk; and
    a control section for increasing rotational speed of the optical disk in excess of the maximum rotational speed when the warpage is detected and for not increasing the rotational speed of the optical disk in excess of the maximum rotational speed when warpage is not detected.

2. An optical disk drive for reproducing data in an optical disk, comprising:
    a section for setting a maximum rotational speed of the optical disk in accordance with a type of the optical disk;
    a section for reproducing data at an outer radius of the optical disk for a trial reproduction; and
    a control section for performing reproduction when the trial reproduction is impracticable by increasing rotational speed of the optical disk in excess of the maximum rotational speed and for performing reproduction when the trial reproduction is practicable by not increasing the rotational speed of the optical disk in excess of the maximum rotational speed.

3. The optical disk drive according to claim 2, wherein the trial reproduction is performed at the maximum rotational speed.

4. The optical disk drive according to claim 3, wherein the control section again reproduces data by decreasing the rotational speed when reproduction of data becomes impracticable as a result of data being reproduced by increasing the rotational speed.

5. An optical disk drive for reproducing data in an optical disk, comprising:
    a section for setting a first maximum speed in accordance with a type of an optical disk;
    a section for reproducing data at an outer radius of the optical disk and at the first maximum speed for a trial reproduction; and
    a control section for reproducing data by means of rotationally driving the optical disk at second maximum speed that is lower than the first maximum speed, in accordance with any of an amount of side-to-side runout, mass eccentricity, and eccentricity of the optical disk when the trial reproduction is possible and by means of rotationally driving the optical disk at a third maximum speed that exceeds the first maximum speed when the trial reproduction is impracticable.

6. The optical disk drive according to claim 5, wherein, when the trial reproduction is impracticable, the control section rotationally drives the optical disk at an inner radius thereof and at the second maximum speed and rotationally drives the optical disk at an outer radius thereof and at the third maximum speed.

7. The optical disk drive according to claim 5, wherein, when the trial reproduction is impracticable, the control section rotationally drives the optical disk at inner and intermediate radii thereof and at the second maximum speed and rotationally drives the optical disk at an outer radius thereof and at the third maximum speed.

8. The optical disk drive according to claim 5, wherein, when the trial reproduction is impracticable, the control section rotationally drives the optical disk at an inner radius thereof and at the second maximum speed and rotationally drives the optical disk at intermediate and outer radii thereof and at the third maximum speed.

9. The optical disk drive according to claim 5, wherein, when the trial reproduction is impracticable and when reproduction remains still impracticable at the inner radius of the optical disk even when the optical disk is rotationally driven at the second maximum speed, the control section rotationally drives the optical disk at the first maximum speed or at the third maximum speed.

10. The optical disk drive according to claim 5, wherein the trial reproduction is performed in a startup processing process prior to reproduction of data.

* * * * *

UNITED STATES PATENT AND TRADEMARK OFFICE
CERTIFICATE OF CORRECTION

| | |
|---|---|
| PATENT NO. | : 8,050,161 B2 |
| APPLICATION NO. | : 12/056208 |
| DATED | : November 1, 2011 |
| INVENTOR(S) | : Tatsuya Murata |

It is certified that error appears in the above-identified patent and that said Letters Patent is hereby corrected as shown below:

<u>Column 8, Line 17:</u>
"a section for setting a maximum rotational speed ofthe" should read, --a section for setting a maximum rotational speed of the--.

Signed and Sealed this
Sixth Day of December, 2011

David J. Kappos
*Director of the United States Patent and Trademark Office*